Patented July 26, 1932

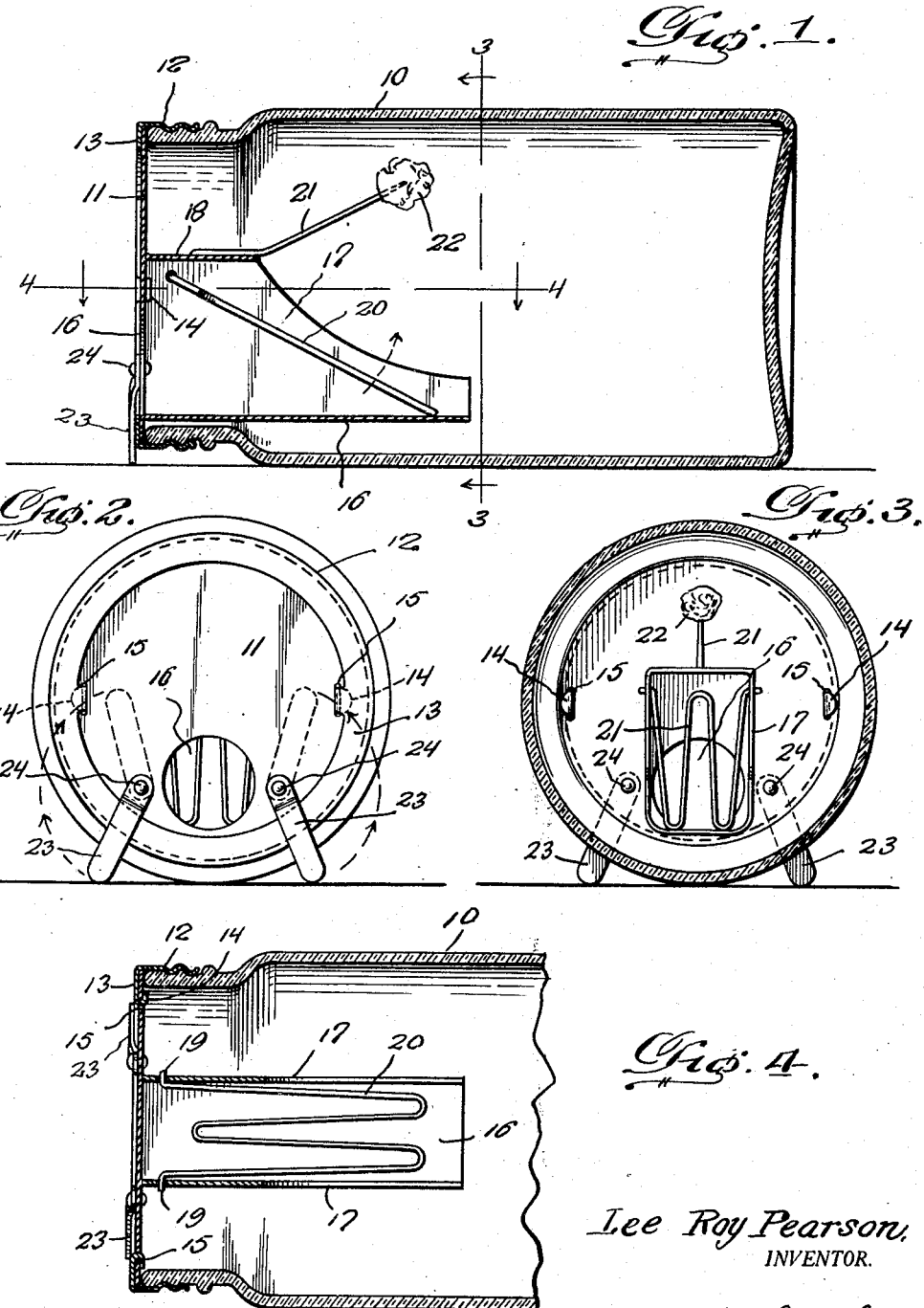

1,868,847

UNITED STATES PATENT OFFICE

LEE ROY PEARSON, OF RANGER, TEXAS

MOUSE TRAP

Application filed July 8, 1931. Serial No. 549,474.

This invention comprehends the provision of a mouse trap, wherein use is made of a well known Mason fruit jar and closure therefor, the latter being especially constructed to provide an entrance opening, and a normally closed door, mounted to permit the mouse to enter the jar, but prevent its escape therefrom.

In accordance with the present invention, I provide a closure for the jar, which includes the entrance opening and trap door, and which closure can be manufactured and sold at a nominal cost, and used in conjunction with any ordinary Mason fruit jar.

Another important object of the invention resides in the provision of a novel construction of means for supporting the trap horizontally upon a suitable support, and to prevent rotation of the receptacle from its normal operative position.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein:

Figure 1 is a longitudinal sectional view through the trap illustrating the same in its normal operative position.

Figure 2 is a front end elevation.

Figure 3 is a sectional view on line 3—3 of Figure 1.

Figure 4 is a sectional view on line 4—4 of Figure 1.

As hereinabove stated, the invention makes use of an ordinary well known Mason fruit jar indicated at 10 and which is closed by a novel construction of closure, which permits the mice to enter the jar 10 and prevents their escape therefrom. This closure may be made and sold as an article of manufacture, and used in conjunction with any fruit jar of the character mentioned.

The closure preferably includes a disk 11 of a diameter to repose upon the neck of the jar 10, and is held associated therewith by means of a flanged retaining ring 12 which is threaded upon the neck of the jar as clearly illustrated. The flange 13 of the ring engages the disk 11, and is characterized by a pair of diametrically opposed bendable lugs 14 which are adapted to be passed downwardly through slots 15 formed in the disk, and subsequently bent at right angles against the under side of the disk. Obviously this construction provides a connection between the component parts of the closure, so that the latter as a unit can be conveniently associated with or removed from the jar 10 as the occasion may require. The disk 11 is provided with an opening 16 to form an entrance, and carried by the disk is a housing for the said entrance, and which housing extends an appreciable distance within the jar 10 as clearly illustrated in Figures 1 and 4. This housing includes a bottom wall 16, opposed side walls 17, and a relatively short top wall 18. The opposed side walls 17 are formed with openings to receive the offset extremities 19 of a pivoted door 20, which is preferably formed from a single length of wire in the manner illustrated. This door normally reposes upon the bottom 16 of the housing, but can be very easily elevated by the mouse as it enters the jar 10, after which the door again assumes its normal closed position to prevent escape of the mouse as will be readily understood. Supported by the top wall 18 of the housing is an arm 21 including an angularly disposed portion spaced an appreciable distance from the housing, and which arm supports the bait 22. The bait is located where it cannot be very easily reached by the mouse. In the operative position of the trap, the jar 10 is arranged in a horizontal position upon a suitable support, with the entrance opening 16 adjacent the support as illustrated in Figure 2. Mice are attracted by the bait, and in an effort to obtain the latter, enter the jar through the opening 16, elevating the pivoted door 20, and once they enter the jar 10 they cannot escape therefrom, as the door automatically assumes its closed position when released by the mouse.

It is necessary to support the jar against rotation from its normal operative position, and for this purpose I provide a pair of supporting legs 23, each of which is pivoted as at 24 on the disk 11. These legs 23 are normally arranged within the confines of the closure, as illustrated by dotted lines in Figure 2, but can be conveniently swung to their active positions, as shown by full lines in Figure 2. These legs can be very easily swung upon their pivots to project beyond the marginal edge of the closure, and engage the support upon which the trap reposes, at opposite sides of the longitudinal center of the trap as illustrated. The legs are slightly offset to extend over the flanged rim forming part of the closure, so that the latter will not interfere with the movement of these legs to either their active or inactive position.

While it is believed that from the foregoing description the nature and advantages of the invention will be readily apparent, I desire to have it understood that I do not limit myself to what is herein shown or described, and that such changes may be resorted to when desired as fall within the scope of what is claimed.

What is claimed is:

1. A trap comprising a receptacle open at one end, a removable closure therefor including a disk having an opening forming an entrance, a housing for said entrance extending into said receptacle, a normally closed inclined door pivoted within the housing, and a pair of supporting legs pivotally mounted on the disk at opposite sides of said entrance opening and normally folded within the confines of the disk, and slightly offset to be extended beyond the peripheral edge of the closure to prevent rolling of the receptacle in a horizontal position.

2. The combination with a trap including a cylindrical receptacle, and a closure therefor having an entrance opening, and a normally closed door controlling said opening, of a pair of substantially flat elongated supporting legs pivoted on the face of the closure and normally folded within the confines thereof, and slightly offset to be extended beyond the peripheral edge of the closure to prevent rolling of the receptacle in a horizontal position.

In testimony whereof I affix my signature.

LEE ROY PEARSON.